2 Sheets--Sheet 2.

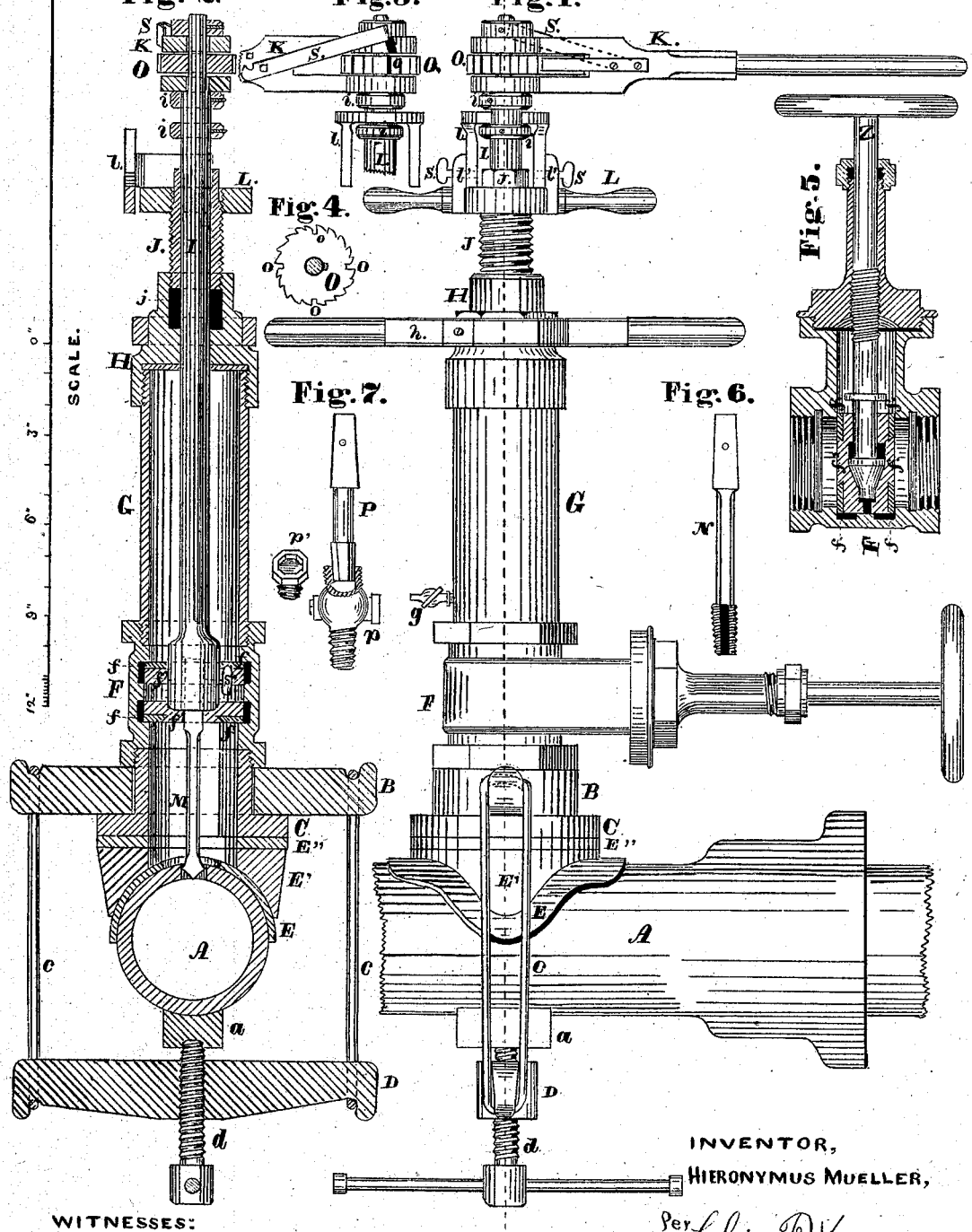

H. MUELLER.
Improvement in Machines for Tapping Water and Gas Mains.
No. 129,853. Patented July 23, 1872.

SCALE FOR FIG. 8.

SCALE FOR FIG'S 9, 10, 11, & 12.

WITNESSES:
Robert R. Montgomery
William T. Cussins

INVENTOR:
HIERONYMUS MOELLER.
Chas P. Housum
His Attorney

UNITED STATES PATENT OFFICE.

HIERONYMUS MUELLER, OF DECATUR, ILLINOIS.

IMPROVEMENT IN MACHINES FOR TAPPING WATER AND GAS MAINS.

Specification forming part of Letters Patent No. 129,853, dated July 23, 1872.

Specification describing certain Improvements in Machines for Tapping Water and Gas Mains, invented by HIERONYMUS MUELLER, of Decatur, in the county of Macon and State of Illinois.

My invention relates to an improvement in machines for tapping water and gas mains when they are under pressure, and so arranged that only the amount of water or gas that the machine holds will be wasted, and that the operator shall not get wet; and consists in a cylindrical case inclosing the mandrel, said mandrel operated with a ratchet; a spring attached to the lever of the ratchet for reversing the mandrel; a feeding device for the drill; an improvement in the valve for shutting off the water from the case; and the clamping device for attaching the machine to the main.

Figure 8:
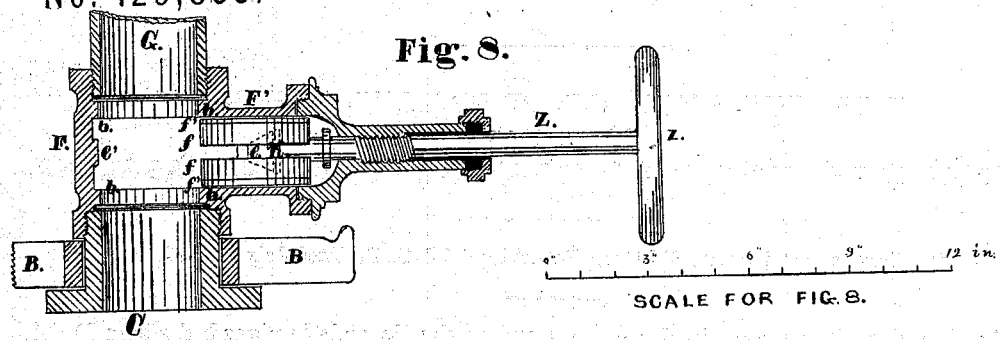
Figure 10:
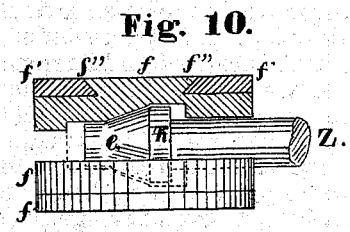
Figure 9:
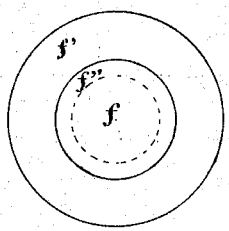

Figure 1 is an elevation of a machine embodying my invention. Fig. 2 is a vertical section taken through the dotted lines $x\,x$, Fig. 1. Fig. 3 is an elevation, showing spring on the ratchet-lever for removing the tap. Fig. 4 is a plan of ratchet-wheel. Fig. 5 is a vertical longitudinal section of valve-box, showing the ports closed; Fig. 6, the tap; Fig. 7, the device for holding the stop-cock or plug; Fig. 8, a section of valve-box with the ports open; Fig. 9, a plan of valve-disk; Fig. 10, a side view and section of the same; and Figs. 11 and 12, plans of feeding device.

A is the water or gas main. E is a rubber gasket placed thereon; E', a washer, concave on the bottom so as to fit the main; and different washers are used, according to the size of the main. E'' is a rubber gasket placed on the washer E', and on the gasket E'' is placed the machine proper, the bottom of which is a flange, C, that is attached to the valve-box F. Between the flange and the valve-box is a circular rim with the arms B. This rim and the arms turn on the top of the flange, so that the valve-stem Z, Fig. 8, can be set parallel with the main, as shown in Fig. 1, or at any other angle thereto, and the arms turned around so that they will be at right angles with the main. As the excavation for tapping the main may be so that it is not convenient to set the valve-stem parallel with the main, and the arms must be at about a right angle with it to secure the machine to the main, $c\,c$ are tie-rods placed on the arms B below the main, and in the tie-rods is placed the arm D, with the set-screw $d$. At the end of the screw is a piece, $a$, concave on top so as to fit the main. Longer tie-rods, bent in the center so as to encircle the main, are used on larger mains than that represented in the drawing. By this arrangement of parts heretofore described, a water or gas tight connection is made between the machine and the main. F is the valve-box. $ff$ are a pair of sliding disk-plates; $f'\,f'$, rubber gaskets, a beveled flange, $f''$, (see Fig. 10,) on the disk-plates, and the inside of the gaskets being beveled, so that when they are expanded and placed over the flange, the retractile force in the rubber draws them firmly into the bevel of the flange. These disk-plates are suspended loosely on the collar $k$ (see Fig. 10) of the valve-stem $z$. The end of the stem is a conical wedge, $e$, fitted into the conical recess between the disks. When the disks rest on the ridge $e'$, and the wedge forced between them by the screw of the stem, each is forced home to its seat $b\,b$, forming two tight joints, a slight turn of the wheel $z$ being sufficient to close both ports perfectly, while by reversing the wheel the disks are freed and are withdrawn into the valve-box, as shown at F' in Fig. 8, leaving the ports entirely clear for the passage of the mandrel I. The rubber gaskets are for the purpose that, as the cuttings from the drill may wash in between the gaskets and the valve-seats $b\,b$, the cuttings will be embedded in the gaskets, and a water-tight joint made. G is a cylindrical case attached to the valve-box. H is the head of the case, with a wrench or handle, $h$, for removing the head from the case. J is a threaded packing-nut. The mandrel I is operated with the ratchet K, and M is the drill held in the mandrel with the thumb-screw $s'$. L is a disk, with handles for turning the same. A circular threaded opening in the center of the disk fits on the thread on the packing-nut J. $l'\,l'$ are uprights on the disk. $b$ is the clamp, slotted, as shown at $l''$, (see Figs. 11 and 12,) and through and in this slot it is placed on the mandrel between the collars $i\,i$. The two arms of said clamp are secured to the arms $l\,l$ with the thumb-screw $s\,s$. As it is desired to feed the drill into the pipe or main, the disk L is turned down on the packing-nut, and the clamp on the mandrel between the collars draws the mandrel down. The bottom of the arms on the clamp are square, so that the clamp cannot turn out from the mandrel until the thumb-screws are entirely removed from the arms of the clamp.

Figure 11:
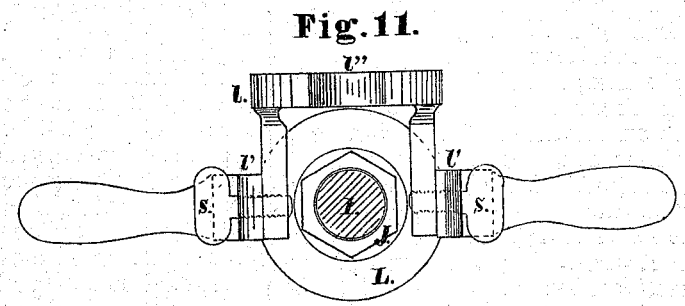
Figure 12:
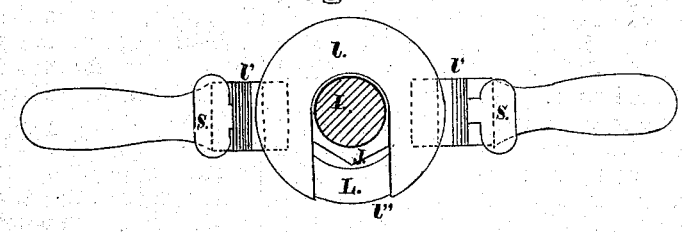

When the hole is drilled through the pipe, the clamp $l$ is removed from the mandrel and placed and secured on the disk L, as shown in Figs. 2 and 11, the disk remaining on the packing-nut, as it is not necessary to use it further in cutting the thread or inserting the stop-cock in the main, and it is out of the way. The mandrel is then withdrawn so that the point of the drill is above the upper port of the valve-box, when the ports are closed with the sliding disk-plates, as shown in Fig. 5. A stop-cock, $g$, in the case G, is used to test if the valve-ports are closed. The head H is unscrewed with the wrench $h$, and the upper part of the machine removed from the case G. Remove the drill M and place the tap N, Fig. 6, in the mandrel, and place the upper part of the machine on the case and secure it with the head H. Withdraw the valve-disks, as shown in Fig. 8, and by means of the ratchet cut the thread in the hole in the pipe.

To remove the tap, slip the spring S (the end of which is bent at a right angle) in one of the openings $o\ o\ o\ o$ in the ratchet-wheel O. (See Fig. 4.) This spring holds the ratchet-lever $k$ to the wheel O so that the tap can be withdrawn. When the tap is removed from the hole in the main and the tap drawn up into the case, close the ports, remove the head H, and remove the tap and place the piece P and stop-cock $p$ (see Fig. 7) in the mandrel. The end of this piece is hexagonal, as is also the opening in the end of the stop-cock; the end of the piece P and the opening in the stop-cock may be made square or any number of sides; the object is to turn the stop-cock into the main, and the piece P readily removed from the stop-cock. Replace the head H, open the ports, and with the ratchet insert the stop-cock into the pipe or main, and the machine removed, the stop-cock having its valve closed previous to placing it in the machine.

When it is desired to remove a stop-cock from and plug the main, the machine is attached, as is above described, with the piece P in the mandrel, and the stop-cock removed and a threaded plug, $p'$, Fig. 7, placed on the piece and inserted in the hole in the main.

By this arrangement of the parts, as all of the joints are suitably packed and water-tight, no water or gas will escape but what is held in the machine—not over one gallon—and the mains tapped when under any amount of pressure without the operator getting wet.

I claim as my invention—

1. The disk or feed L, arms $l'\ l'$, and clamps $l$, in combination with the mandrel I, collars $i\ i$, and packing-nut J, substantially as shown and described.

2. The combination of the head H, case G, sliding disk-plates $f\ f$, substantially as described, and for the purpose set forth.

3. The combination of rubber gasket $f'$, beveled, as shown, with the beveled flange $f''$ of the disk-plate $f$, substantially as shown and described.

4. The combination of the arms B D, tie-rods $c\ c$, gaskets E E'', and the concave washer E', substantially as described, and for the purpose set forth.

5. The improved machine for tapping water and gas mains under pressure, consisting of the several parts hereinbefore specified, constructed and arranged substantially as shown and described.

HIERONYMUS MUELLER.

Witnesses:
CHARLES P. HOUSUM,
WILLIAM B. CHAMBERS.